March 3, 1964  J. HOHL ET AL  3,123,198
CLOSURE CAP ORIENTING APPARATUS
Filed Aug. 7, 1959  4 Sheets-Sheet 2

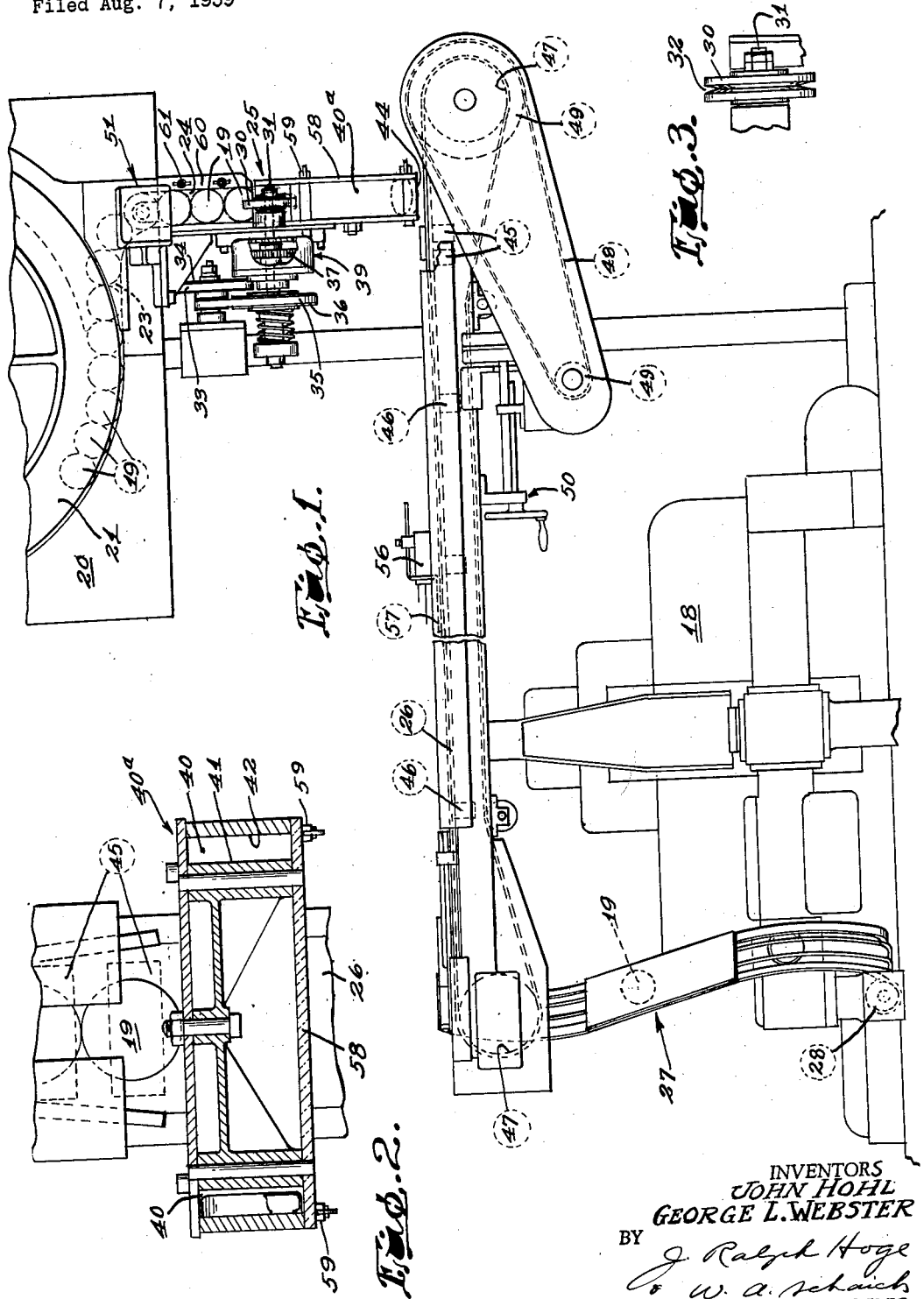

INVENTORS
JOHN HOHL
GEORGE L. WEBSTER
BY
ATTORNEYS

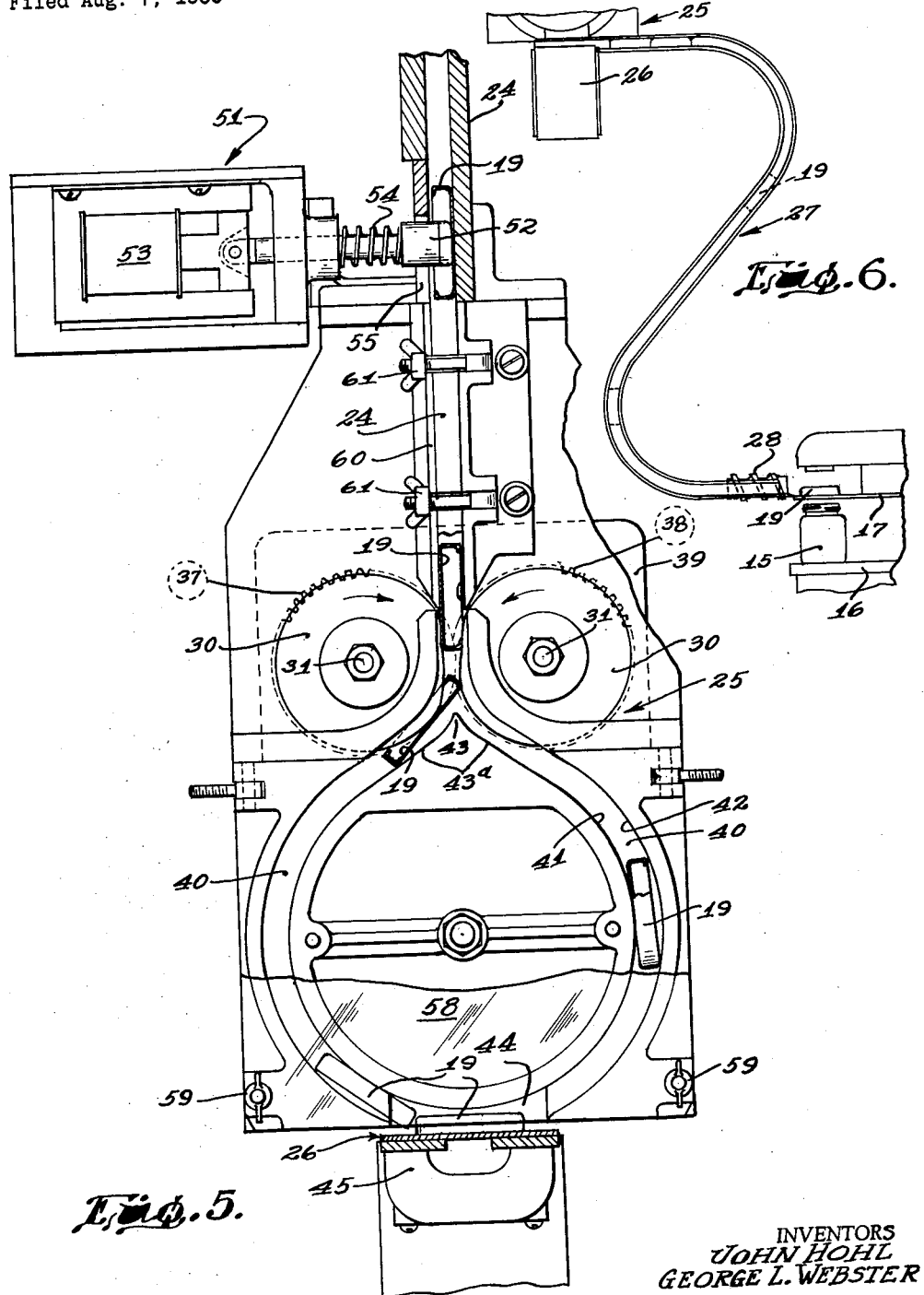

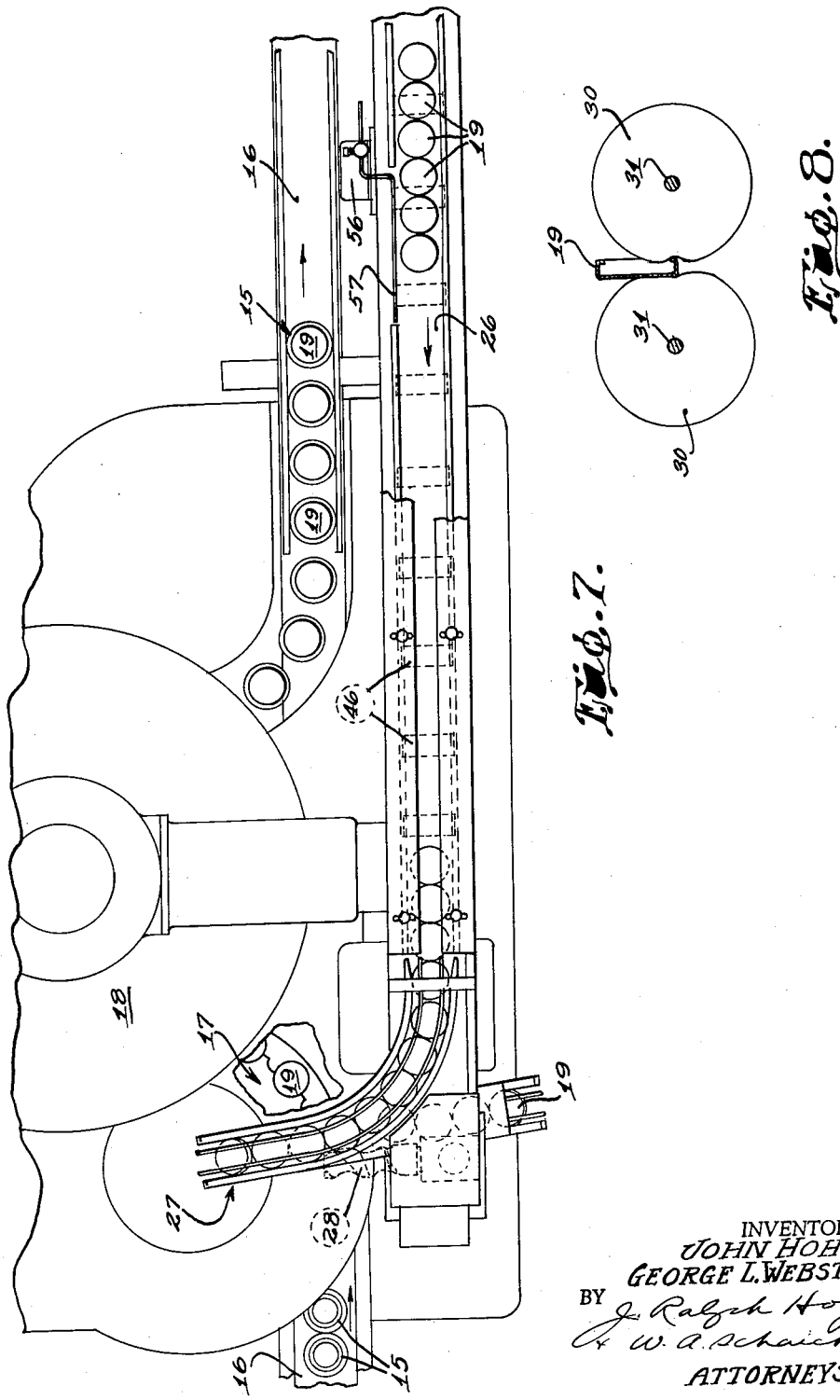

United States Patent Office 3,123,198
Patented Mar. 3, 1964

3,123,198
CLOSURE CAP ORIENTING APPARATUS
John Hohl and George L. Webster, Toledo, Ohio, assignors to Owens-Illinois Glass Company, a corporation of Ohio
Filed Aug. 7, 1959, Ser. No. 832,218
4 Claims. (Cl. 198—33)

The present invention relates to closure cap orienting apparatus and has for its primary object the provision of simple reliable means operable at extremely high speeds for receiving closure caps in random positions, and discharging such caps upon a conveyor open side down for delivery to container closing apparatus.

Our invention is capable of effective use with container closing apparatus of the type shown in Ninneman et al. Patent No. 2,659,522 issued November 17, 1953 (owned by the assignee of the present application) whether utilizing side seal closure caps, as shown, or converted to handle screw or lug closure caps, as revealed in Bjering Patent No. 2,876,606 issued March 10, 1959. In both instances, it is imperative that the closure caps arrive at the closing apparatus open side down ready to be picked up by cap applying chucks preparatory to their being pressed, or threaded onto filled receptacles. In one conventional form of closure cap handling apparatus, the caps are deposited in random fashion in a hopper and from this hopper are fed by a rotor or drum to a bottom outlet opening. In some few instances, devices associated with this rotor are intended to orient the closure caps, but they are unsatisfactory in that the operate at too slow speeds and additionally, handle the caps quite roughly and seriously mar the surface at times.

An important object of our invention is the provision of novel and effective means for properly orienting closure caps for delivery to capping apparatus at extremely high speed and without marring the cap surface or causing any distortion.

A further object of our invention is the provision of a novel arrangement of closure cap orienting or turning rolls to which closure caps are fed from a hopper and by which these caps are delivered in proper position for entry into guides leading to a conveyor.

Another object of our invention is the provision of a conveyor and permanent magnet arrangement for quickly removing oriented caps from beneath guides associated with the orienting means whereby to insure positive high speed handling of the caps.

It is also an object of our invention to provide novel means for controlling the flow of caps to the orienting rolls whereby to interrupt such flow in the event of jamming beyond the cap chutes.

Other objects will be in part apparent and in part pointed out hereinafter.

In the drawings:

FIG. 1 is a side elevational view of a closure cap orienting apparatus incorporating our invention.

FIG. 2 is a sectional view, with parts in elevation, taken along the plane of line 2—2 of FIG. 4.

FIG. 3 is an elevational view of a modified form of roll which we may use in our apparatus.

FIG. 5 is an enlarged elevational view with parts in section showing certain of the elements illustrated in FIG. 4.

FIG. 6 is a view illustrating the manner in which oriented closure caps are transferred from the conveyor of our apparatus to the closing machine.

FIG. 7 is a fragmentary top plan view of that portion of the apparatus at and in proximity to the cap discharge end.

FIG. 8 is a detail elevational view of the orienting rolls with a closure cap in section between the meeting faces of said rolls.

Figure 4:
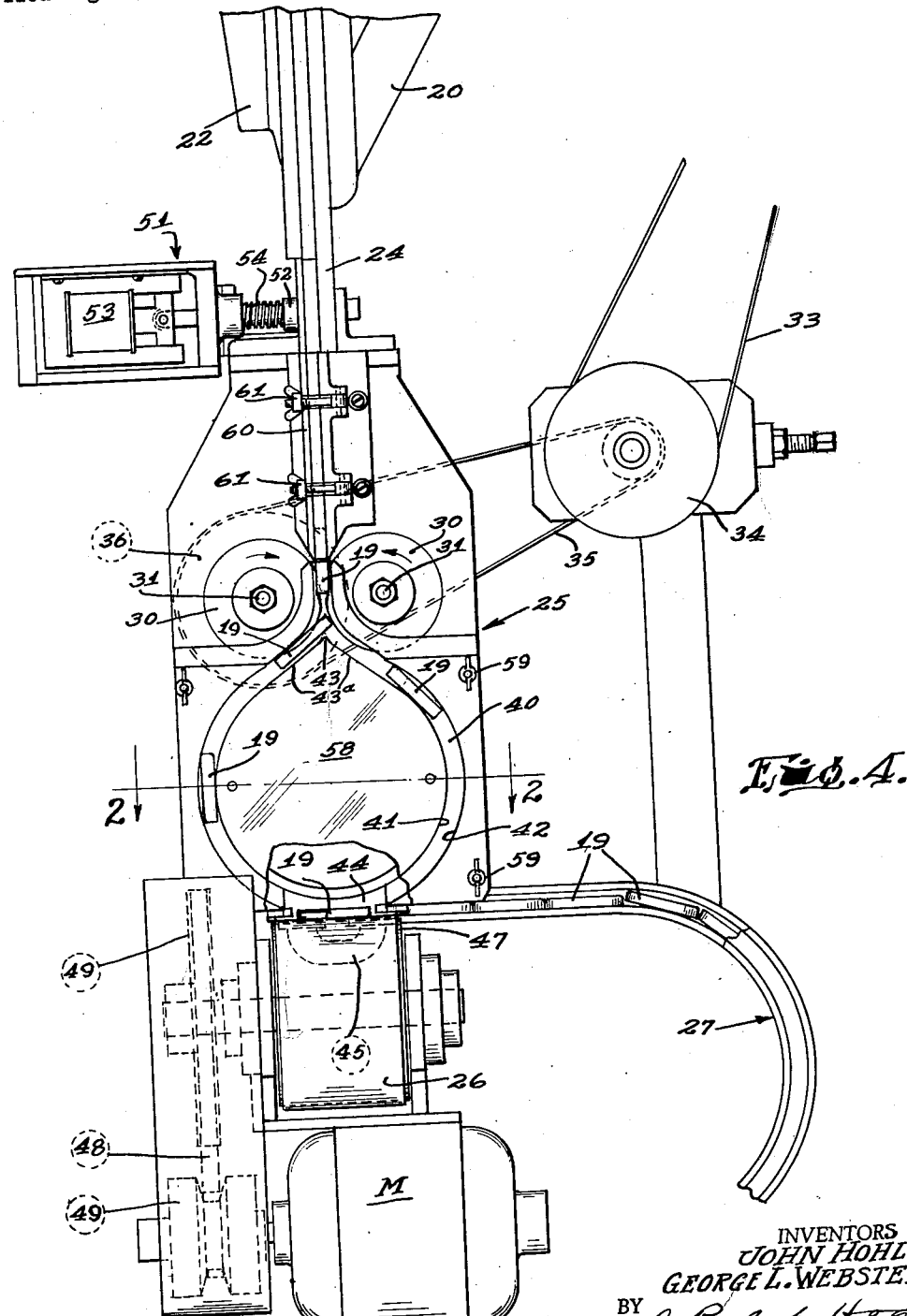
FIG. 4 is an end elevational view of the apparatus.

In the illustrated embodiment of our invention, it is operating in conjunction with closing apparatus such as that forming the subject matter of the Ninneman et al. patent, but modified to incorporate the cap rotating features of the Bjering patent. Product-filled jars 15 are carried by a conveyor 16 beneath a closure cap supporting turret 17 (FIGS. 6 and 7) which is positioned in proximity to a closing or cap affixing unit 18. Beyond this unit closed jars are carried to a packing station (not shown) by an extension of the conveyor 16. It is imperative that the closure caps 19 be placed open side down upon the turret 17 for the obvious reason that if reversely positioned they cannot be affixed to the jars. Our invention provides completely reliable means for so positioning the closure caps at speeds of the order of about 1000 per minute.

Our apparatus is suitably connected to a closure cap hopper 20 or drum of conventional, or any preferred form, including a rotor or drum 21 and a housing 22 provided with a bottom outlet 23 through which the closure caps 19 are discharged in succession and then move vertically downward on edge and in single file through a guide 24 to the orienting unit 25. Following orientation the closure caps are carried by an endless horizontal conveyor 26 to a generally reverse S-shaped guide 27 (FIGS. 6 and 7) the upper cap receiving end of which overlies the discharge end of the conveyor 26, while the lower or exit end of said guide is associated with a worm feed 28 which positively advances the caps 19 to proper positions upon the turret 17. From this turret the caps are removed and affixed to the jars within the closing unit 18 in conventional fashion.

The orienting unit 25 comprises a pair of rolls 30 mounted upon horizontal parallel shafts 31 which are positioned above and with their axes extending lengthwise of the conveyor 26. These rolls may be formed of soft rubber or rubber-like material, or perhaps a somewhat less resilient material, such as polyethylene, if, as shown in FIG. 3, the periphery is provided with a relatively deep circumferential groove or channel 32. When so grooved, the peripheral portion becomes adequately resilient to perform the function intended, as will be apparent presently. Also, the peripheries of the two rolls are almost, if not actually, in contact with each other, there being in any event only a very slight clearance between them. These rolls are driven by a motor (not shown) operating through a belt 33 (FIGS. 1 and 4), a pulley 34 and a second belt 35 which is trained over a pulley 36, the latter connected to an extension of one of the shafts 31 and driving a gear 37 on said one shaft. This gear runs in mesh with and drives a second gear 38, the latter being mounted upon a second shaft 31 and both gears being enclosed in a housing 39.

The lower or exit end of the cap chute 24 terminates adjacent to and just above the contiguous peripheries of the rolls 30. From this chute, the caps move "on-edge" into engagement with both rolls 30 (FIG. 8) deforming the peripheral portions of the latter as said caps move downward between and under positive control of the rolls. As perhaps is best shown in FIGS. 5 and 8, each closure cap, as it moves below the common horizontal plane of the axes of the rolls 30, turns on a horizontal axis and tends to travel with the periphery of that roll which engages the open or inner side of the cap. This action results from the free edge of the cap skirt or flange biting deeply into the soft rubber roll and so interlocking the two elements that the cap must remain and move with the roll a short distance. Thus some closure caps tend to travel peripherally with one roll and other caps in like fashion with the other roll. These caps immediately enter one of two generally semi-circular guides or channels 40 (FIGS. 2, 4 and 5) comprising a generally heart-shaped guide unit 40ª. These guides 40 are formed about a common horizontal axis extending lengthwise of and above the center of the conveyor 26. Each guide or channel 40 comprises inner and outer walls 41 and 42, respectively, spaced apart a distance only slightly greater than the depth of a closure cap. Thus two caps cannot enter a guide simultaneously and jam the machine. The inner wall 41 is provided at its uppermost surface with an upstanding deflector 43 which projects into the space between the lower halves of the rolls 30. The opposed guiding surfaces 43ª adjacent and leading to the top end of this deflector 43 are substantially concentric with the rolls 30 and spaced from the periphery of said rolls sufficiently to permit free movement of the caps into the guides proper. Thus as a cap moves downwardly and begins to turn ever so slightly with one of the rolls 30, the deflector engages the leading portion of the cap and together with the roll positively directs the cap into one or the other of the guides 40. At the bottom end the exterior walls 42 terminate near the side margins of the conveyor 26, thereby providing an exit 44 overlying said conveyor. Through this exit the closure caps are discharged successively and deposited open side down upon the conveyor.

Because these caps flow to the exit 44 from both guides 40, it is necessary that they be moved quite rapidly away from beneath said exit by the conveyor 26. These closure caps are relatively lightweight articles and ordinarily may not settle down upon the conveyor, after dropping thereonto, quickly enough to insure clear conveyor surface to receive succeeding caps. In such circumstances, the closure caps would pile up beneath the guides 40 and disrupt normal operations. To avoid such conditions, we arrange a relatively strong permanent magnet 45 just below the upper reach of the conveyor immediately in front of the guides 40. Additional magnets 46 are spaced along the conveyor. Thus the closure caps, just prior to contacting the conveyor are quickly pulled away from beneath the guides exit 44 by the magnet 45 and thereby clear the path of other caps which are about to be discharged from the guides 40. Without this magnet, the maximum operating speed must be materially reduced.

The conveyor 26 which is trained over rolls 47, is driven continuously by a motor M operating through an endless belt 48 and pulleys 49. A conventional tightener 50 is provided for the conveyor 26.

In the event closure caps are not removed rapidly enough from the conveyor 26 to make room for additional caps received from the guides 40, it is necessary to momentarily halt the feeding of caps to the rolls 30. Accordingly, we provide a stop device 51 (FIGS. 1, 4 and 5) comprising a plunger or rod 52 carried by and normally held retracted by an electromagnet 53. A coil spring 54 operates to project the plunger 52 through an opening 55 in the cap chute 24 into firm holding contact with a closure cap 19 or into a space between adjacent caps, when the electrical circuit to the magnet is broken. Such a break in the circuit is effected by opening a normally closed microswitch 56 (FIGS. 1 and 7), there being a cap actuated switch operating finger 57 positioned alongside the path of travel of the caps on the conveyor. Should caps jam the conveyor line and as a consequence move the finger 57, the switch will open and allow the coil spring 54 to project the plunger 52 into the cap chute into contact with a cap 19. Thus the flow of caps will be interrupted until the caps move normally along the conveyor and out of contact with the switch finger 57.

By reference to FIG. 2, it will be noted that the cap guide unit 40ª has a transparent cover plate 58 through which the operator may observe the flow of caps. Fasteners 59 releasably hold the cover 58 in place. Likewise, a transparent cover plate 60 is provided for the cap chute 24, such being held in place by bolts 61 or the like fasteners. Thus the operator may quickly detect any undesirable operating condition in these elements and remedy same rather easily.

Modifications may be resorted to within the spirit and scope of the appended claims.

We claim:

1. In combination a continuously moving horizontal conveyor, closure cap delivery and orienting means overlying the conveyor and comprising a pair of resilient rolls mounted for rotation about parallel horizontal axes with peripheral portions substantially in rolling contact with each other, means for so rotating the rolls that an article placed between them from above is moved downwardly, a vertical cap delivery chute utilizing gravity to position closure caps seriatim and on edge between the rolls, cap guide means positioned between the conveyor and rolls including a pair of generally arcuate guides formed substantially on a common horizontal axis which extends longitudinally of and above the conveyor, said guides having inner guiding surfaces joined together at their upper ends and having outer guiding surfaces formed with horizontally spaced apart lower ends immediately above the conveyor and through which closure caps are discharged from the guides for placement open side down upon the conveyor, cap deflector means at the juncture of the upper end of said inner guiding surfaces projecting upwardly medially between the lower halves of the rolls whereby it positively engages and at least in part guides closure caps prior to their losing contact with the orienting rolls, means for delivering closure caps on edge and in random fashion to the upper end of said chute, and a magnet positioned beneath the conveyor forwardly of the opposed open lower ends of the arcuate guides to thereby advance the closure caps generally in the direction of travel of the conveyor prior to actual contact of discharged caps with the conveyor whereby to rapidly remove closure caps from beneath the guides and out of the path of travel of succeeding caps.

2. The combination defined in claim 1 and guide means at the discharge end of the conveyor for transferring closure caps to a container closing machine.

3. The combination defined in claim 2, the guide means being a generally reverse S-shape channel extending to a cap discharge point in a plane below the horizontal conveyor.

4. In combination a continuously moving endless horizontal conveyor including an upper article supporting reach having closure cap receiving and discharging ends, a hopper having a bottom outlet opening directly above the receiving end of said conveyor through which sheet metal closure caps make their exit in succession, a vertical chute for guiding the closure caps in an on-edge position toward the conveyor, means interposed between the chute and conveyor for orienting closure caps discharged from the chute and delivering them open side down to a position just above the conveyor and a magnet immediately beneath the upper reach of the conveyor, positioned to one side of the orienting means for advancing the closure caps generally in the direction of travel of the conveyor during their free movement from said orienting means to positions of rest upon the conveyor, the closure cap orienting means comprising a pair of arcuate guides formed on a common horizontal axis which is above and extends lengthwise of the conveyor, said guides having a common upper inlet for closure caps and a pair of opposed open lower discharge ends above and near opposite sides of the conveyor, cap deflecting means at the upper end of and common to the two guides and a pair of peripherally resilient rolls mounted for rotation about horizontally spaced-apart axes which are parallel with the axis of said guides, the rolls being of such diameter that they are substantially in contact with each other, the cap deflecting means and the closure contacting surface of the guides merging with the former being at least in part concentric with the periphery of the rolls and positioned between them.

References Cited in the file of this patent

UNITED STATES PATENTS

| | | |
|---|---|---|
| 1,425,374 | Elgy | Aug. 8, 1922 |
| 1,777,139 | Fitzgerald et al. | Sept. 30, 1930 |
| 2,158,069 | Grover | May 16, 1939 |
| 2,584,526 | Albertoli | Feb. 5, 1952 |
| 2,641,371 | Webster | June 9, 1953 |
| 2,656,907 | Page | Oct. 27, 1953 |
| 2,758,434 | Johnson et al. | Aug. 14, 1956 |